US012812446B2

(12) United States Patent
Moon et al.

(10) Patent No.: US 12,812,446 B2
(45) Date of Patent: Nov. 24, 2026

(54) METHOD AND APPARATUS FOR TRANSMITTING DATA ACCORDING TO QUALITY OF SERVICE IN WIRELESS COMMUNICATIONS SYSTEM

(71) Applicant: Samsung Electronics Co., Ltd., Suwon-si (KR)

(72) Inventors: Sangjun Moon, Suwon-si (KR); Jungshin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 718 days.

(21) Appl. No.: 17/981,879

(22) Filed: Nov. 7, 2022

(65) Prior Publication Data

US 2023/0156515 A1 May 18, 2023

(30) Foreign Application Priority Data

Nov. 12, 2021 (KR) ........................ 10-2021-0155992

(51) Int. Cl.
*H04W 28/02* (2009.01)
*H04W 76/10* (2018.01)
*H04W 80/10* (2009.01)

(52) U.S. Cl.
CPC ....... *H04W 28/0268* (2013.01); *H04W 76/10* (2018.02); *H04W 80/10* (2013.01)

(58) Field of Classification Search
CPC ......... H04L 12/4641; H04W 28/0268; H04W 4/08; H04W 48/17; H04W 48/18;
(Continued)

(56) References Cited

U.S. PATENT DOCUMENTS 10,736,155 B2 8/2020 Dao et al.
2005/0157660 A1 7/2005 Mandato et al.
(Continued)

FOREIGN PATENT DOCUMENTS

CN 112218315 A 1/2021
WO 2020/092173 A1 5/2020
(Continued)

OTHER PUBLICATIONS

3GPP; TSG SA; Study on architectural enhancements for 5G multicast-broadcast services (Release 17)', 3GPP TR 23.757 V0.5.0 (Sep. 2020), Sep. 11, 2020.
(Continued)

*Primary Examiner* — Asad M Nawaz
*Assistant Examiner* — Natali Pascual Peguero
(74) *Attorney, Agent, or Firm* — Jefferson IP Law, LLP

(57) ABSTRACT

A method performed by a first node in a wireless communication system is provided. The method includes receiving, from a first terminal via a second node, a protocol data unit (PDU) session setup request message, obtaining, from a third node and a fourth node, group information and subgroup information, in which the group information includes a list of a plurality of subgroups and the subgroup information includes quality of service (QoS) information for each of subgroups, transmitting, to a fifth node, a traffic forwarding setup request message including the group information and subgroup information, and transmitting, to the first terminal, a PDU session setup response message including the group information and the subgroup information.

18 Claims, 10 Drawing Sheets

(58) Field of Classification Search
CPC ..... H04W 76/10; H04W 76/12; H04W 76/40; H04W 80/10
See application file for complete search history.

(56) References Cited

U.S. PATENT DOCUMENTS

| | | | | |
|---|---|---|---|---|
| 2012/0300688 | A1 | 11/2012 | Gholmieh et al. | |
| 2018/0352483 | A1 * | 12/2018 | Youn | H04L 63/0272 |
| 2019/0191467 | A1 * | 6/2019 | Dao | H04W 76/11 |
| 2020/0228936 | A1 | 7/2020 | Talebi Fard et al. | |
| 2020/0351984 | A1 | 11/2020 | Talebi Fard et al. | |
| 2022/0182861 | A1 * | 6/2022 | Youn | H04W 24/08 |

FOREIGN PATENT DOCUMENTS

| | | | | |
|---|---|---|---|---|
| WO | 2021/119627 | A1 | 6/2021 | |
| WO | 2021/141348 | A1 | 7/2021 | |
| WO | WO-2022152238 | A1 * | 7/2022 | H04W 76/11 |

OTHER PUBLICATIONS

Nokia et al., 'How to handle associated QoS flows for individual fallback in policy control', S2-2106433, 3GPP TSG-SA WG2 Meeting #146-e, Aug. 10, 2021.

International Search Report dated Feb. 2, 2023, issued in International Application No. PCT/KR2022/017341.

Samsung, Update of Solution #7 for KI #5 to resolve Ens, 3GPP TSG-WG SA2 Meeting #151E e-meeting, S2-2204060, Jun. 5, 2022.

Japanese Office Action dated Mar. 18, 2025, issued in Japanese Patent Application No. 2024-527668.

3rd Generation Partnership Project; Technical Specification Group Services and System Aspects; Study on architectural enhancements for 5G multicast-broadcast services (Release 17), 3GPP TR 23.757 V17.0.0 (Mar. 2021), Mar. 31, 2021, pp. 1-298, XP052000263.

Huawei et al., New SID on generic group management, exposure and communication enhancements, S2-2108574, 3GPP TSG-WG SA2 Meeting #148E e-meeting, Nov. 8, 2021, XP052076572.

Extended European Search Report dated Dec. 23, 2024, issued in European Patent Application No. 22893128.3.

3rd Generation Partnership Project; Technical Specification Group Services and System Aspects; Study on architectural enhancements for 5G multicast-broadcast services (Release 17), 3GPP TR 23.757 V0.5.0, Sep. 11, 2020.

Korean Office Action dated Jun. 8, 2026, issued in Korean Patent Application No. 10-2021-0155992.

* cited by examiner

METHOD AND APPARATUS FOR TRANSMITTING DATA ACCORDING TO QUALITY OF SERVICE IN WIRELESS COMMUNICATIONS SYSTEM

CROSS-REFERENCE TO RELATED APPLICATION(S)

This application is based on and claims priority under 35 U.S.C. § 119 (a) of a Korean patent application number 10-2021-0155992, filed on Nov. 12, 2021, in the Korean Intellectual Property Office, the disclosure of which is incorporated by reference herein in its entirety.

BACKGROUND

1. Field

The disclosure relates to a method and an apparatus for transmitting data according to a quality of service (QoS) in a wireless communication network. More particularly, the disclosure relates to a method and an apparatus for simultaneously transmitting data to multiple groups having different QoSs by one application of a terminal when group communication is supported in a 3rd generation partnership project (3GPP) 5th generation (5G) system (5GS).

2. Description of Related Art 5G mobile communication technologies define broad frequency bands such that high transmission rates and new services are possible, and can be implemented not only in "Sub 6 gigahertz (GHz)" bands such as 3.5 GHZ, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz bands (for example, 95 GHz to 3 terahertz (THz) bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mm Wave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

A 5G system (5GS) corresponding to a new communication scheme led by the 3GPP is utilized in smart energy infrastructure so that various applications can be transferred through one terminal. In this case, the 5GS should support a communication method using group communication having different QoS requirements. In addition, the 5GS should simultaneously support multiple groups in one terminal. The multiple groups should satisfy different QoS requirements. If one application in one terminal performing group communication transmits data to multiple groups, same data should be transmitted several times. In addition, if the number of groups to which the data should be simultaneously transmitted increases, unnecessary redundant transmissions also increase.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for supporting efficient communication with multiple groups having different QoS requirements in a 5GS.

Another aspect of the disclosure is to provide a method and an apparatus for supporting communication from one terminal to multiple groups, and preventing redundant transmission when the respective groups have multiple QoS requirements.

Another aspect of the disclosure is to provide a method and an apparatus for performing communication according to required QoSs when group communication is supported in one terminal and different terminals in a group require different QoSs.

Additional aspects will be set forth in part in the description which follows and, in part, will be apparent from the description, or may be learned by practice of the presented embodiments.

In accordance with an aspect of the disclosure, a method for controlling a session management function (SMF) device in a wireless communications system to transmit data at different qualities of service (QoSs) in an identical service group is provided. The method includes receiving a protocol data unit (PDU) session request requested by a first user equipment (UE) from an access and mobility management function (AMF), acquiring group information corresponding to a requested PDU session from a user data repository (UDR) device, based on the PDU session request, wherein the group information includes information on two or more groups, determining at least one UPF which is to transfer data transmitted from the first UE to at least one another UE, based on the acquired information corresponding to each of the groups, and requesting traffic forwarding and QoS setup from the determined UPF in accordance with a group corresponding to the at least one UE, and causing traffic to be transmitted to the first UE and the at least one UE according to the different QoSs.

According to the disclosure, communication with multiple groups having different QoS requirements can be simultaneously supported in a 5GS. In addition, according to the disclosure, efficient communication with multiple groups having different QoS requirements can be supported in the 5GS. Specifically, according to the disclosure, communication from one terminal to multiple groups can be supported, and redundant transmission can be prevented when there are different QoS requirements. In addition, according to the disclosure, when group communication is supported in one terminal and different terminals in a group require different QoS requirements, communication can be performed according to the QoSs required by the respective terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
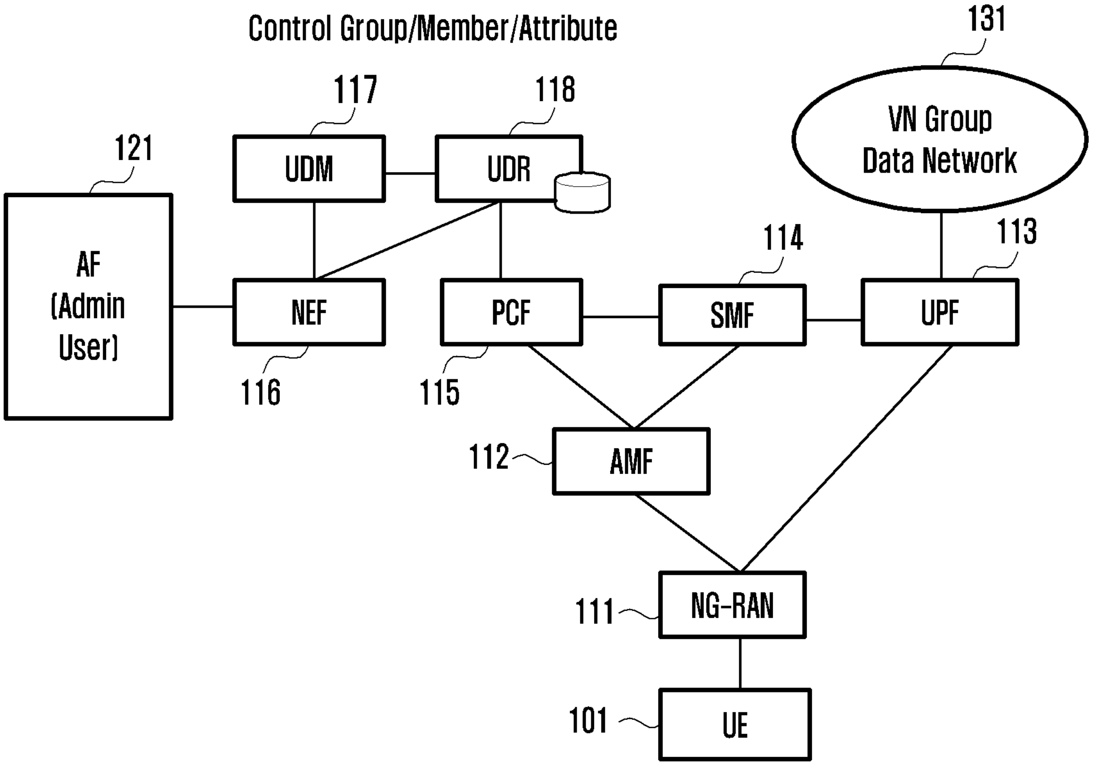
FIG. 1 illustrates a network configuration for describing a 5G VN group management method according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Particular terms as used in the following description are merely provided to help understanding pf the disclosure, and other types of terms may be used without departing from the scope of the technical idea of the disclosure.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, a node may correspond to AMF, SMF, UPF, UDM, UDR, PCF, NEF, AF, or other network function. For example, a first node may correspond to UPF, a second node may correspond to AMF, a third node may correspond to UDM or UDR, a fourth node may correspond to PCF or NEF, a fifth node may correspond to UPF, and a sixth node may correspond to AF. Each node referred to as an ordinal number is not limited to this example.

In the following description, the disclosure will be described using terms and names defined in the 5GS and NR standards, which are the latest standards specified by the 3rd generation partnership project long term evolution (3GPP LTE) among the existing communication standards, for the convenience of description. However, the disclosure is not limited by these terms and names, and may be applied in the same way to systems that conform other standards. In particular, the disclosure may be applied to the 3GPP 5GS/NR (5th generation mobile communication standards).

An infrastructure for smart energy transmits state/event information to a central server of various applications distributed in several areas, and the central server transmits adjustment information or individual configuration information or configuration information for all/some groups to various applications distributed in regions.

FIG. 1 illustrates a network configuration for describing a 5G VN group management method according to an embodiment of the disclosure.

Referring to FIG. 1, a user equipment (UE) 101, as an electronic device capable of 5G wireless communication, may be connected to an NG-RAN 111 corresponding to a base station in a 5G wireless communication scheme. It should be noted that a connection between the UE 101 and the NG-RAN 111 among the configurations connected by the solid lines in FIG. 1 is at least a connection using wireless communication. In addition, in the disclosure, for convenience of description, a description is made using a 5G wireless communication scheme, but a connection may be made in other wireless communication schemes. For example, a connection may be made in a Wi-Fi scheme or through a 4G wireless communication network, or may be made through a 6G wireless communication network beyond the 5G wireless communication network.

The UE 101 is an electronic device capable of wireless communication, and may include a mobile terminal (MT), a mobile station (MS), and the like. In addition, the UE 101 may also be a hand-held phone (HHP), a smartphone, a tablet computer, and an Internet of Things (IoT) device.

The NG-RAN 111 operating as a base station may communicate with the UE 101 in a wireless communication scheme according to the 5G protocol, and may perform communication with UEs 101 in a predetermined base station boundary. The NG-RAN 111 may be implemented as a single base station, and may be implemented as a central unit and one or more remote units. Such an NG-RAN 111 may be referred to as a base station (BS), a Node-B corresponding to a base station employing a 3G mobile communication scheme, and an eNode-B corresponding to a base station employing a 4G mobile communication scheme, and may be referred to as a gNode-B corresponding to a base station employing a 5G mobile communication scheme.

In the upper layer of the NG-RAN 111, network function (NF) devices constituting a 5GC may be included. With respect to such NF devices, multiple NF devices may be implemented in one server, and one NF device may be implemented by multiple servers. In addition, when NF devices are implemented in a server, the NF devices may be implemented as software. In such a case, a program for driving the corresponding NF device may be mounted on a memory.

In addition, one NF may be implemented as one instance. When one NF is implemented as one instance, multiple instances performing the same operation in one server may be driven.

In addition, one or more NF devices may be implemented as a single network slice, and may operate to satisfy specifications required in a specific service. In the description below, each of the NF devices is described as an NF itself having a specific name, for convenience of description.

Hereinafter, the respective NF devices constituting the 5GC is described.

A (core) access and mobility management function (AMF) 112 may provide a function for UE-unit access and mobility management, and may be generally connected to one AMF for each UE. Specifically, the AMF 112 may support functions of: signaling between CN nodes for mobility between 3GPP access networks; termination of a radio access network (RAN) CP interface (i.e., an N2 interface); termination of non-access stratum (NAS) signaling (N1); NAS signaling security (NAS ciphering) and integrity protection; AS security control; registration management (registration area management); connection management; idle mode UE reachability (including controlling and performing of paging retransmission); mobility management control (subscription and policy); intra-system mobility and inter-system mobility support; network slicing support; SMF selection; lawful interception (for an interface to an AMF event and an L1 system); delivery and provision of a session management (SM) message between a UE and an SMF; transparent proxy for SM message routing; access authentication; access authorization including roaming authority checking; delivery and provision of an SMS message between an UE and an SMF; security anchor function (SAF) and/or security context management (SCM); and the like. Some or all of the functions of the AMF 112 may be supported in a single instance of one AMF.

A user plane function (UPF) 113 may transfer a downlink protocol data unit (PDU) received from a data network (DN), to the UE 101 through the NG-RAN 111, and may transfer an uplink PDU received from the UE 101, to the DN through the NG-RAN 111. Specifically, the UPF 113 may support functions of: an anchor point for intra/inter-RAT mobility; an external PDU session point of interconnection to a DN; packet routing and forwarding; a user plane part of policy rule execution and packet inspection; lawful interception; traffic usage reporting; an uplink classifier for supporting routing of a traffic flow to a data network; a branching point for supporting a multi-homed PDU session; QoS handling (for example, packet filtering, gating, and uplink/downlink rating execution) for a user plane; uplink traffic verification (SDF mapping betting a service data flow (SDF) and a QoS flow); intra-uplink and intra-downlink transport level packet marking; downlink packet buffering and downlink data notification triggering; and the like. Some or all of the functions of the UPF 113 may be supported in a single instance of one UPF.

A session management function (SMF) 114 may provide a session management function, and when the UE has multiple sessions, the SMF may be managed by different SMFs for the respective sessions. Specifically, the SMF 114 may support functions of: session management (for example, session establishment, modification, and termination, including maintaining a tunnel between the UPF 113 and the NG-RAN 111); UE IP address allocation and management (selectively including authentication); UP function selection and control; traffic steering configuration for routing traffic to an appropriate destination from the UPF 113; termination of an interface toward policy control functions; exertion of a control part of a policy and quality of service (QoS); lawful interception (for an interface to an SM event and an L1 system); termination of an SM part of a NAS message; downlink data notification; an AN-specific SM information publisher (delivery to the NG-RAN 111 through the N2 via the AMF 112); session SSC mode determination; roaming; and the like. Some or all of the functions of the SMF 114 may be supported in a single instance of one SMF.

A policy control function (PCF) 115 may receive information on a packet flow from an application server, and provide a function of determining a policy such as mobility management and session management. Specifically, the PCF 115 may support functions of: supporting a unified policy framework for network operation control; providing a policy rule so that control plane function(s) (for example, AMF, SMF, etc.) can execute the policy rule; implementation of a front end for access to subscription information related to policy determination in a user data repository (UDR).

A network exposure function (NEF) 116 may provide a means for safely exposing services and capabilities provided by 3GPP network functions, for example, for a 3rd party, internal exposure/re-exposure, an application function, and edge computing. The NEF 116 may receive information (based on exposed capability(ies) of other NF(s)) from other NF(s). The NEF 116 may store information received as structuralized data by using a standardized interface as a data storage network function. The stored information may be re-exposed to other NF(s) and AF(s) by the NEF 116, and may be used for other purposes such as analysis.

A unified data management (UDM) 117 may store subscription data, policy data, and the like of a user. The UDM 117 may include two parts: an application front end (FE) (not shown); and a user data repository (UDR).

The FE may include a UDM FE for performing location management, subscription management, processing of credentials, etc., and a PCF for performing policy control.

A user data repository (UDR) 118 may store data required for functions provided by the UDM-FE and a policy profile required by the PCF. The data stored in the UDR may include policy data and user subscription data including session-related subscription data, access and mobility-related subscription data, a subscription identifier, and security credentials. The UDM-FE may access subscription information stored in the UDR and support functions such as authentication credential procession, user identification handling, access authentication, registration/mobility management, subscription management, and SMS management.

An application function (AF) 121 may transfer a group request related to an application to a 5G network, and may receive information which can be utilized by an application, from the 5G network. For example, the AF 121 may request generation/modification/deletion of a group from the 5G network for application of group management, and receive a result of processing of the request for generation/modification/deletion from the 5G network.

A VN group data network 131 is a data network (DN) supporting a 5G virtual network (VN), and is connected to the UPF 113 in the same manner as a general DN. The DN may mean a network connected to the UPF 113 allocated for each service. A form in which two or more UEs forms a group and each of the UEs corresponding to members of the group is mapped to a data network name (DNN) subject to mutual broadcast/multicast/unicast in one 5G LAN may be represented as a 5G VN data network or a 5G VN group data network. Here, 5G indicates a case of UEs connected to the 5GC, and thus in a universal network including a form other than 5G, the network may be represented as a VN data network or a VN group data network. The form in which two different groups are mapped to different DNNs may be represented as, for example, VN1 DN which is a data network mapped to VN1, and VN2 DN which is a data network mapped to VN2.

In the above-described configuration, the AF 121 may be a device existing external to the 5GC. Accordingly, the AF 121 may configure a group in the UDR 118 through the NEF 116. More specifically, the AF 121 may generate/modify/delete the group in the UDR 118, add/delete a group-specific member, and configure a group-specific attribute.

Figure 2:
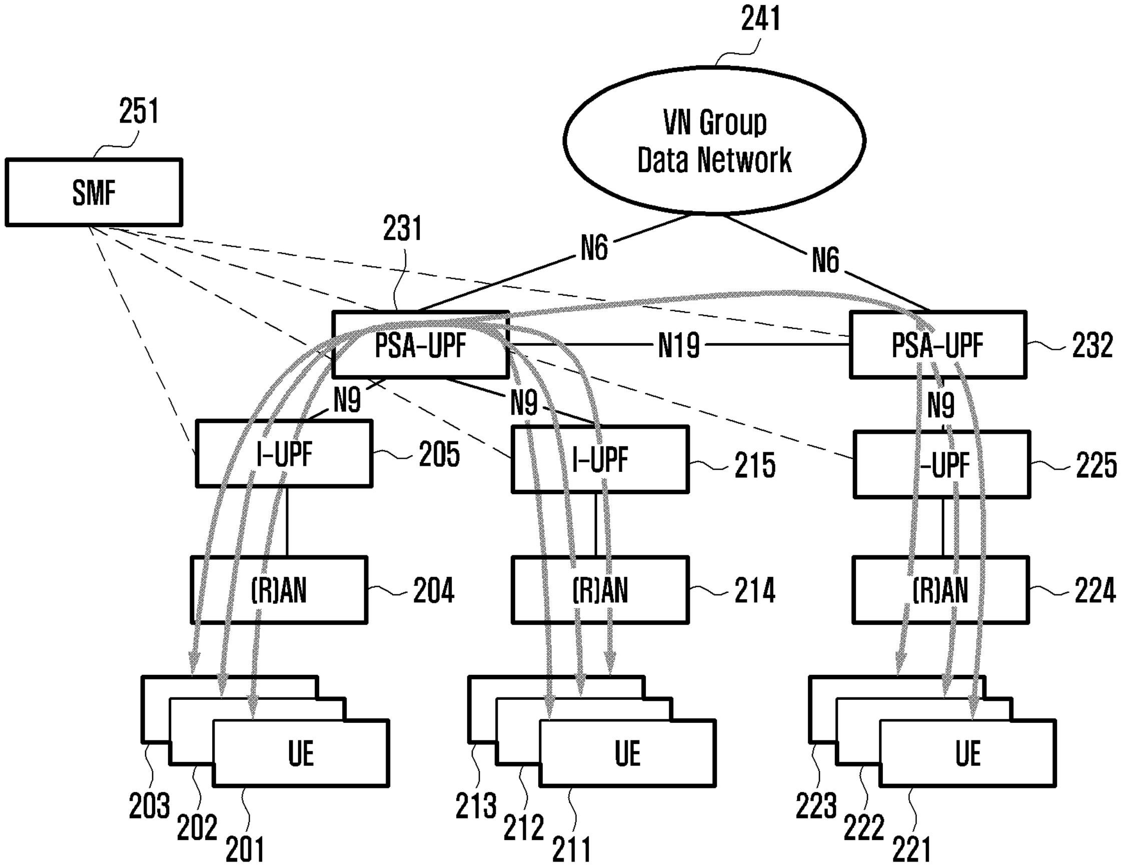
FIG. 2 illustrates network and UE configurations for describing a 5G VN group communication method according to an embodiment of the disclosure.

FIG. 2 illustrates network and UE configurations for describing a 5G VN group communication method according to an embodiment of the disclosure.

In FIG. 2, reference numerals different from those in FIG. 1 are used. However, the same NFs illustrated in both FIG. 1 and FIG. 2 may perform the same operation. In addition, specific NFs may perform additional operations according to functions thereof. A more detailed description thereof will be made below.

Referring to FIG. 2, (R)ANs 204, 214, and 224 may be base stations corresponding to the NG-RAN 111 of FIG. 1. Accordingly, each of the (R)ANs 204, 214, and 224 may have its own communication area (area of boundary).

FIG. 2 illustrates a case where a first UE 201, a second UE 202, and a third UE 203 are positioned in an area of a first (R)AN 204, a case where a fourth UE 211, a fifth UE 212, and a sixth UE 213 are positioned in an area of a second (R)AN 214, and a case where a seventh UE 221, an eighth UE 222, and a ninth UE 223 are positioned in an area of a third (R)AN 224.

In addition, FIG. 2 illustrates a case where the first (R)AN 204 is connected to a first I-UPF 205, a case where the second (R)AN 214 is connected to a second I-UPF 215, and a case where the third (R)AN 224 is connected to a third I-UPF 215. A case where the first I-UPF 205, the second I-UPF 215, and the third I-UPF 225 are connected to the same SMF 251 is illustrated. An I-UPF stands form an intermediate-UPF, and connects a (R)AN and a PDU session anchor (PSA) UPF having a final routing function with a DN. There may be multiple I-UPFs between the PSA UPF and the (R)AN.

Each of the first I-UPF 205 and the second I-UPF 215 is connected, through an N9 interface, to a first PSA-UPF 231 operating as a PDU session anchor (PSA) connected to a VN group DN 241, the third I-UPF 225 is connected, through the N9 interface, to a second PSA-UPF 232 connected to the VN group DN 241. In addition, the first PSA-UPF 231 and the second PSA-UPF 232 are connected through an N19 interface, and each of the first PSA-UPF 231 and the second PSA-UPF 232 may be connected to the VN group DN 241 through an N6 interface.

Referring to FIG. 2, the 5G VN group DN 241 in which the first UE 201 having established a PDU session by using a group-specific data network name (DNN) transmits or receives data to or from other UEs in the group, for example, the fourth UE 211 positioned in the second (R)AN 214 and the seventh UE 221 positioned in the third (R)AN 224, is illustrated. Hereinafter, for convenience of description, a case where the first UE 201 transmits data to other UEs 202, 203, 211, 212, 213, 221, 222, and 223. In addition, data reception may be performed in the reversed direction of a data transmission path described below, the reception may be performed through a reverse process described below. In addition, a case where UEs in the group, other than the first UE 201, transmit or receive data may be understood if the first UE 201 is replaced by other UEs, and thus for prevention of redundant description, only a case where the first UE 201 transmits data to other UEs is described.

As described in the above assumption, data to be transmitted by the first UE 201 to other UEs in the corresponding group may be transmitted to the first PSA-UPF 231 through the first (R)AN 204 and the first I-UPF 205. Accordingly, when data (e.g., data to the fourth UE 211) received from the first UE 201 needs to be provided to the second I-UPF 215 corresponding to another UPF in the first PSA-UPF 231, the first PSA-UPF 231 may forward the data to the fourth UE 211 through the second I-UPF 215 and the second (R)AN 214. In addition, when the same data received from the first UE 201 needs to be provided to the seventh UE 221, the first PSA-UPF 231 may forward the data to the second PSA-UPF 232 by using the N19 interface. Then, the second PSA-UPF 232 may forward the data to the third I-UPF 225 which is connected to the second PSA-UPF itself through the N9 interface. Accordingly, the third I-UPF 225 may forward the data to the seventh UE 221 through the third (R)AN 224.

Figure 3:
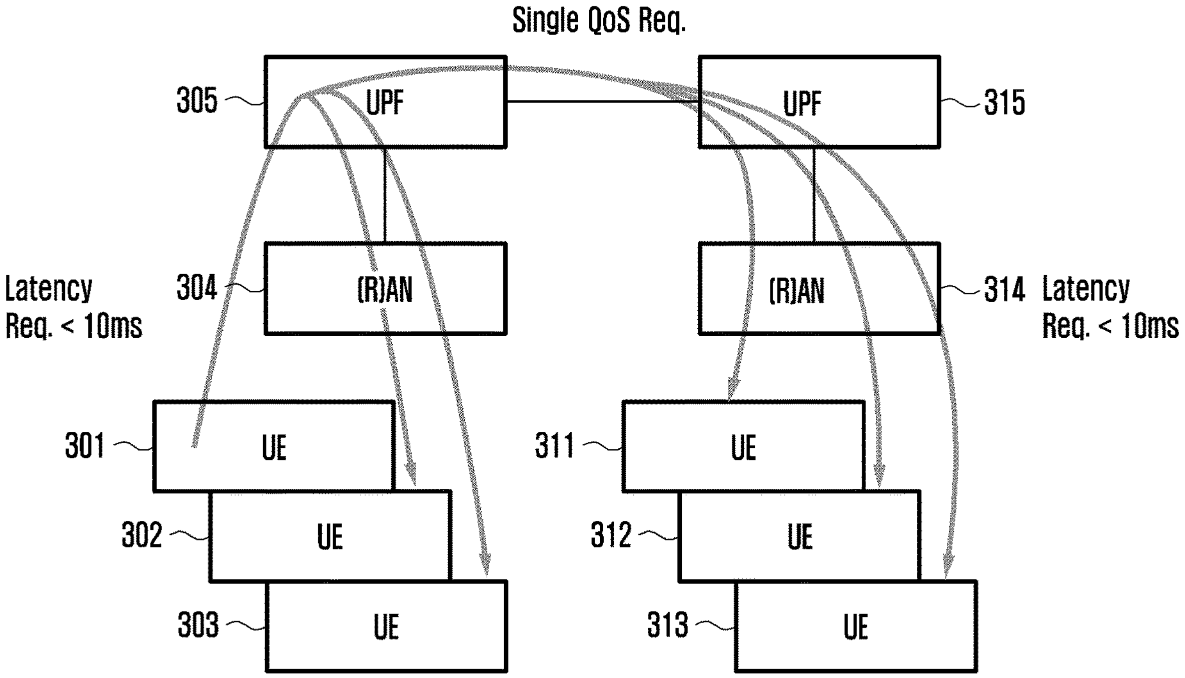
FIG. 3 illustrates communication of multiple groups supporting different QoS requirements according to an embodiment of the disclosure.

FIG. 3 illustrates communication of multiple groups supporting different QoS requirements according to an embodiment of the disclosure.

FIG. 3 may be a more simplified illustration of that of FIG. 2, and for convenience of description, different reference numerals are used, but it should be apparent to those skilled in the art that the same configuration described in FIGS. 1 and 2 may perform the same operation.

Referring to FIG. 3, a case where a first UE 301, a second UE 302, and a third UE 303 may be positioned in an area of a first (R)AN 304 is illustrated, and a case where a fourth UE 311, a fifth UE 312, and a sixth UE 313 are positioned in an area of a second (R)AN 314 is illustrated. In addition, a case where the first (R)AN 304 is connected to a first UPF 305 and the second (R)AN 314 is connected to a second UPF 315 is illustrated. The first UPF 305 and the second UPF 315 may be connected to each other through an N9 interface and/or an N19 interface.

In the example of FIG. 3, a case where the first UE 301, the second UE 302, the third UE 303, the fourth UE 311, the fifth UE 312, and the sixth UE 313 require the same single QoS is illustrated. For example, a case where the single QoS has latency requirement equal to or less than 10 ms is assumed and described.

The case where the first UE 301, the second UE 302, the third UE 303, the fourth UE 311, the fifth UE 312, and the sixth UE 313 require the same single QoS may be a case where one DNN is used for each PDU session allocated to each UE and one DNN is mapped to one group. In such a case, data transmitted by the first UE 301 is provided to the first UPF 305 through the first (R)AN 304. In this case, when data transmitted by the first UE 301 needs to be received by all other UEs in the same group, transmission may be performed as follows.

In a case of data received from the first UE 301 is transmitted to data transmitted to the second UE 302 and the third UE 303, the first UPF 305 may transmit the data through the first (R)AN 304 again. When the data received from the first UE 301 needs to be provided the fourth UE 311, the fifth UE 312, and the sixth UE 313, the first UPF 305 needs to first find the second UPF 315 corresponding to another UPF in which respective UEs are positioned. The first UPF 305 may forward the data received from the first UE 301 to the second UPF 315. Thereafter, the second UPF 315 may forward the received from the fourth UE 311, the fifth UE 312, and the sixth UE 313 to the first UE 301 through the second (R)AN 314.

In this case, the second UE 302 and the third UE 303 exist in the area of the first UPF 305 corresponding to a UPF which is at least identical to that of the first UE 301. In addition, FIG. 3 illustrates a case where the UEs are positioned in the same (R)AN 304.

On the other hand, the fourth UE 311, the fifth UE 312, and the sixth UE 313 are positioned in an area of a UPF which is at least different from that of the first UE 301. Accordingly, when the required latency requirements are equal to or less than 10 ms and are identical, it may be difficult to adjust the corresponding latency requirement in accordance with the fourth UE 311, the fifth UE 312, and the sixth UE 313. In addition, depending on data traffic, even though the latency requirement is 10 ms, the latency within a predetermined range may be allowed. However, for all UEs currently grouped in one group, the same single QoS is required.

Accordingly, the disclosure provides a solution to the problem above. For example, a method for allowing different QoSs to be applied in one group is proposed so that a QoS required when UEs exist in an area of a UPF at least identical to the first UE 301 or are positioned in the same (R)AN is provided, and a slightly lower QoS is provided to UEs connected to a UPF different from the UPF connected to the first UE 301.

A case where there are UEs existing in an area of a UPF which is at least identical to that of the first UE 301 may be a case where the distance (physical or logical distance) by which the UEs are spaced from the first UE 301 is not large. A higher QoS or a required QoS may be provided to UEs which are close to a UE transmitting data among UEs existing in the same group. According to the above-mentioned example, when the required latency requirement is within 10 ms, data may be provided within 10 ms.

On the other hand, a case where UEs are positioned in an area of a UPF different from that of the first UE 301 transmitting data may be a case where the distance (physical or logical distance) by which the UEs are spaced from the first UE 301 is large. A QoS lower than the required QoS may be provided to UEs which are spaced by a large distance from a UE transmitting data among UEs existing in the same group. According to the above-mentioned example, when the required latency requirement is within 10 ms, data may be provided within 20 ms which is lower than the required latency requirement.

Figure 4:
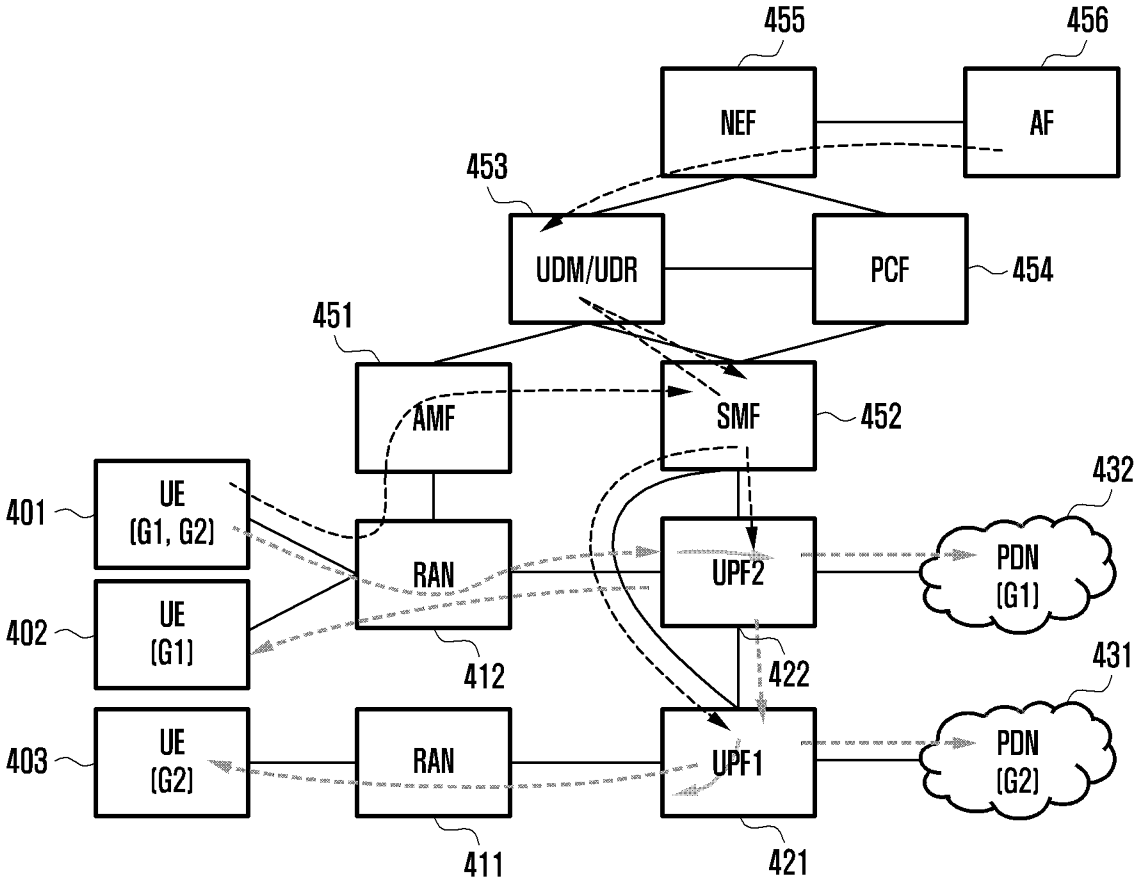
FIG. 4 is a network configuration for describing a PDU session setup method for multiple groups supporting different QoS requirements according to an embodiment of the disclosure.

FIG. 4 is a network configuration for describing a PDU session setup method for multiple groups supporting different QoS requirements according to an embodiment of the disclosure.

Referring to FIG. 4, elements having the same names as those disclosed in FIGS. 1 to 3 may perform the same operation. For example, the AMF 112 of FIG. 1 may perform the same operation as the AMF 451 of FIG. 4. Accordingly, it should be noted that FIG. 4 describes only an additional operation other than the details described in FIGS. 1 to 3.

FIG. 4 illustrates three different UEs 401, 402, and 403. To indicate that a first UE 401 is a UE receiving first group and second group services, G1 and G2 are indicated in the drawing. In addition, to indicate that a second UE 402 is a UE receiving a first group service, G1 is indicated in the drawing, and to indicate that a third UE 403 is a UE receiving a second group service, G2 is indicated in the drawing. Here, a first group and a second group are subgroups belonging to one upper group.

The first UE 401 and the second UE 402 may be connected to a second PDN 432 providing a first service, through a second RAN 412 and a second UPF 422. In addition, a third UE 403 may be connected to a first PDN 431 providing a second service, through a first RAN 411 and a first UPF 421. Among the other remaining configuration, a part different from FIG. 1 is a UDM/UDR 453. The UDM/UDR 453 may be a case where the UDM 117 and the UDR 118 mentioned in FIG. 1 are implemented as one element, or may be understood as a simplified form for convenience of illustration of the drawing. In the disclosure, there is no specific limitation thereto.

Hereinafter, a method according to the disclosure is described. As a method for configuring one group for providing a specific service, one of the following methods may be used.

First, a method for pre-configuring two or more subgroups in one upper group, and using a DNN indicating the upper group during configuration of a PDU session may be considered.

Second, there is a method for configuring different PDU sessions for respective subgroups by using multiple DNNs corresponding to multiple groups.

A case of the first method is described first. A procedure of the method for pre-configuring two or more subgroups in one upper group and using a DNN indicating the upper group during a PDU session is as follows.

First, an AF 456 may configure at least one upper group having multiple subgroups in the 5GS. The respective subgroups may be configured so that the respective subgroups have different QoS requirements. The AF 456 may transmit different QoS requirements or requirement information for the respective subgroups to NFs of the 5GC through an NEF 455. For example, the AF 456 may transmit different QoS requirements for the respective subgroups to the UDM/UDR 453 through the NEF 455. Accordingly, a specific NF of the 5GC may map a QoS requirement for each subgroup to a policy in the 5GC network and determine a QoS policy to be actually supported. Accordingly, the UDM/UDR 453 may provide information on the different QoS requirements required for the respective subgroups to a PCF 454 for managing a policy. The number of types of the QoS requirements requested by the AF 456 may be different from the number of QoS policies determined to be actually supported by the PCF 454. For example, even though the AF 456 requests five different QoS requirements for five different subgroups, there may be four types of QoS policies to be mapped and actually supported by the PCF 454. In this case, the number of QoS policies to be actually supported and determined by the PCF 454 may be equal to or less than the number of types of QoS requirements required for respective subgroups by the AF 456.

A case where the first UE 401 among the multiple UEs requests a PDU session setup is described below. The first UE 401 may request a PDU session setup to a DNN corresponding to a representative group. The PDU session setup request transmitted by the first UE 401 may be provided to the AMF 451 through the second RAN 412 in which the first UE 401 is positioned. Accordingly, the AMF 451 may select an SMF, based on a DNN included in the PDU session setup request. In the example of FIG. 4, only one SMF 452 is illustrated, in the actual 5GC, there may be multiple SMFs, and the AMF 451 selects one SMF, based on a DNN from among the multiple SMFs. However, it should be noted that FIG. 4 illustrates only one SMF for convenience of understanding and simplification of the drawing. In addition, the AMF 451 may transmit the PDU session setup request transmitted by the first UE 401 to the selected SMF 452. Here, the SMF 452 selected by the AMF 451 may be an SMF capable of performing the PDU session setup request transmitted by the first UE 401, and may be determined based on the DNN.

When receiving, from the AMF 451, the PDU session setup request transmitted by the first UE 401, the SMF 452 may retrieve subgroup information from an upper group information from the UDR 453. That is, the SMF 452 may request subgroup information while providing upper group information of the first UE 401 to the UDR 453, and receive the subgroup information of the first UE 401 as a response from the UDR 453. The SMF 452 may identify information from the subgroup information received from the UDR 453 to information on a member included in the subgroup. In addition, the SMF 452 may request, from the PCF 454, subgroup-specific QoS policy information for a subgroup corresponding to the first UE 401, and receive the subgroup-specific QoS policy information from the PCF 454. In another example, the SMF 452 may have already received and stored a QoS policy for each subgroup from the PCF 454.

The SMF 452 may select a UPF according to the subgroup information received from the UDR 453, and request a forwarding table setup from the selected UPF. In addition, the SMF 452 may proceed with a QoS configuration according to a QoS policy of a subgroup, received from the PCF 454. In the first embodiment, a case where a service is provided to two groups having different QoS policies in one upper group is assumed. Accordingly, a forwarding table may be configured so that subgroup QoS policies provided to the second UPF 422 by the SMF 452 have different QoSs according to groups. That is, it may be configured so that a first group (G1) and a second group (G2) corresponding to two subgroups having different QoSs have different QoSs by using one supper group.

The second UPF 422 may configure a forwarding table upon a request from the SMF 452. For example, one upper group service which enables the first UE 401 to cause other UEs to receive data may be assumed. In this case, the data may be transmitted by the first UE 401, or the first UE 401 may request transmission of the data from a specific DNN. A case where in such a service, there are two different subgroups, i.e., the first group (G1) and the second group (G2), may be assumed.

In this case, the first group (G1) corresponding to one of subgroups included in an upper group may have a first level of QoS, and the second group (G2) corresponding to the other one of the subgroups included in the upper group may have a second level of QoS. In this case, a case where the first level of QoS has a higher priority than the second level of QoS is assumed. Accordingly, the second UPF 422 may configure a forwarding table so that data is transmitted to a member (e.g., the second UE 402) corresponding to the first group (G1) at the first level of QoS, and may configure a forwarding table so that data is transmitted to a member (e.g., the third UE 403) corresponding to the second group (G2) at the second level of QoS.

The forwarding table is configured so that forwarding for a subgroup having a higher QoS has a higher priority than forwarding for a subgroup having a lower QoS. A group-specific forwarding priority may be determined based on the level of a QoS policy mapped by the PCF 454 according to the request from the AF 456. Accordingly, even though there are five subgroups, there may be four stages of forwarding, the priority of which is distinguished based on the level of the QoS policy mapped by the PCF 454. Therefore, for both the first group and the second group illustrated in FIG. 4, a case where the PCF 454 has mapped different QoS policies is assumed.

The first UE 401 may transmit data at the highest QoS among QoSs of subgroups. For example, when the first group (G1) has the highest QoS, the first UE 401 may transmit data to the second PDN 432 through the second RAN 412 and the second UPF 422 at the QoS of the first group (G1). Accordingly, the second UPF 422 may provide the data received from the second PDN 432 to a member having the highest priority based on the forwarding table received from the SMF 452, i.e., to the second UE 402 belonging to the first group (G1), through the second RAN 412.

In addition, after transmitting the data to the second UE 402, the second UPF 422 may identify that there are remaining members. In a case of the example of FIG. 4, it may be identified that data has not been transmitted to the third UE 403 belonging to the second group (G2). Accordingly, the second UPF 422 may select a subgroup having the highest priority from among the remaining members. In FIG. 4, only two groups are assumed, and thus the second group (G2) may be selected. However, if there is a third group having a priority lower than that of the second group (G2), the second UPF 422 may select the second group (G2) according to the priority from among the second group (G2) and the third group.

In addition, the second UPF 422 may configure a destination as the third UE 403 while transmitting data to the first UPF 421 so that the data is transmitted to the third UE 403 corresponding to a member of the second group. Accordingly, the first UPF 421 may transmit the data received from the second UPF 422 to the third UE 403 through the first RAN 411.

The case where one upper group includes two subgroups has been assumed and described above. However, even in a case where one upper group includes three or more subgroups, the same operation may be performed according to the scheme described above. That is, when there is a receiver (e.g., a UE) in a lower subgroup than other members in the upper group, the above-described operation may be repeatedly performed through a UPF configured for transmission of data to the corresponding receiver.

Next, a procedure of a method for configuring different PDU sessions for respective subgroups by using multiple DNNs corresponding to the respective subgroups is described.

First, the AF 456 may configure multiple groups in the 5GS. Here, the multiple groups may be understood to correspond to the above-described multiple subgroups belonging to one supper group. However, in the disclosure, for convenience of understanding, each of the multiple groups is described as a form of one group. The respective multiple groups may be configured to have different QoS requirements. The AF 456 may transmit different QoS requirements or requirement information for the respective groups to NFs of the 5GC through an NEF 455. For example, the AF 456 may transmit different QoS requirements for the respective groups to the UDM/UDR 453 through the NEF 455. Accordingly, a specific NF of the 5GC may map a QoS requirement for each group to a policy in the 5GC network and determine a QoS policy to be actually supported. Accordingly, the UDM/UDR 453 may provide information on the different QoS requirements required for the respective groups to the PCF 454 for managing a policy. The number of types of the QoS requirements requested by the AF 456 may be different from the number of QoS policies determined to be actually supported by the PCF 454. For example, even though the AF 456 requests five different QoS requirements for five different groups, there may be four types of QoS policies to be mapped and actually supported by the PCF 454. In this case, the number of QoS policies to be actually supported and determined by the PCF 454 may be equal to or less than the number of types of QoS requirements required for respective groups by the AF 456.

A case where the first UE 401 among the multiple UEs requests a PDU session setup for each group distinguished by each DNN is described below. The first UE 401 may request a PDU session setup to multiple DNNs corresponding to multiple groups. The PDU session setup request transmitted by the first UE 401 may be provided to the AMF 451 through the second RAN 412 in which the first UE 401 is positioned. The AMF 451 having received the PDU session setup request may select an SMF, based on a DNN having the highest priority, or may select an SMF supporting all of the multiple DNNs. The DNN having the highest priority may be configured in advance. In another example, the AMF 451 may read QoS information configured for each DNN in the PCF 454, and determine a DNN having the highest QoS policy. In another example, the AMF 451 may determine the SMF according to the order of the DNN included in the PDU session setup request received from the first UE 401. As described in the embodiment above, there may be multiple SMFs in the 5GC. However, FIG. 4 illustrates only one SMF for convenience of understanding and simplification of the drawing. Accordingly, in the second embodiment of FIG. 4, a case where the SMF 452 is selected is assumed and described.

When receiving, from the AMF 451, the PDU session setup request transmitted by the first UE 401, the selected SMF 452 may retrieve information on the multiple groups from the UDR 453. That is, the SMF 452 provide information on each group from which the first UE 401 has requested a service, to the UDR 453, and receive information for each group. The SMF 452 may identify information from the group-specific information received from the UDR 453 to information on a member of each group. More specifically, the SMF 452 may request group-specific QoS policy information from the PCF 454 according to DNN-specific groups from which the first UE 401 has requested the PDU session, and may receive the group-specific QoS policy information from the PCF 454.

The SMF 452 may select a UPF according to the information on groups, received from the UDR 453, and request a forwarding table setup from the selected UPF. In addition, the SMF 452 may proceed with a QoS configuration according to QoS policies of groups, received from the PCF 454. FIG. 4 illustrates two different UPFs. The first UPF 421 is a UPF connected to the first PDN 431, and the second UPF 422 is a UPF connected to the second PDN 432. That is, the first PDN 431 may correspond to one DNN, and the second PDN 432 may correspond another DNN. The DNNs may be DNNs having different QoSs.

As described above, the first UE 401 may transmit service data for the first group (G1) and the second group (G2) corresponding to two groups having different QoSs for each group. Accordingly, the SMF 452 may select the second UPF 422 to provide a service corresponding to the first group (G1). In addition, the SMF 452 may select the first UPF 421 to provide a service corresponding to the second group (G2).

Each UPF may configure a forwarding table upon a request from the SMF 452. For example, a service may be assumed so that a service based on data (or request) transmitted by the first UE 401 is provided to other UEs. In this case, for the first group (G1) corresponding to the first DNN, the SMF 452 may select the second UPF 422, and a forwarding table and the second PDN 432 for providing a service of the first group (G1) to the selected UPF 422 may be configured. Accordingly, the second UPF 422 may configure a path, based on the forwarding table and the second PDN 432 so that the service of the first group (G1) is provided.

In addition, for the second group (G2) corresponding to the second DNN, the SMF 452 may select the first UPF 421, and a forwarding table and the first PDN 431 for providing a service of the second group (G2) to the selected first UPF 421 may be configured. Accordingly, the first UPF 421 may configure a path, based on the forwarding table and the first PDN 431 so that the service of the second group (G2) is provided. Therefore, the forwarding tables provided to the first UPF 421 and the second UPF 422 may be different.

Each UPF may configure a forwarding table so that forwarding for a group having a higher QoS has a higher priority than forwarding for a group having a lower QoS. A group-specific forwarding priority may be determined based on the level of a QoS policy mapped by the PCF 454 according to the request from the AF 456. Accordingly, even though there are five groups, there may be four stages of forwarding, the priority of which is distinguished based on the level of the QoS policy mapped by the PCF 454.

The first UE 401 may transmit data at the highest QoS among QoSs of multiple groups. For example, when the first group has the highest QoS, the first UE 401 may transmit data to the second PDN 432 through the second RAN 412 and the second UPF 422. Accordingly, the second UPF 422 may provide the data received from the second PDN 432 to a member having the highest priority based on the forwarding table received from the SMF 452, i.e., to the second UE 402 belonging to the first group (G1), through the second RAN 412.

In addition, the first UPF 421 may transmit the data received from the first PDN 431, based on the forwarding table configured based on the QoS information received from the SMF 452, to the third UE 403 through the first RAN 411. In this case, when the QoS level of the first group (G1) is higher than the QoS level of the second group (G2), a higher QoS may be configured for the first group (G1). For example, when the latency requirements required by the first group (G1) is assumed as 10 ms, the latency requirement required by the second group may be 20 ms.

The case where two groups are included has been assumed and described above. However, even in a case where three or more groups are included, the same operation may be performed according to the scheme described above.

Figure 5:
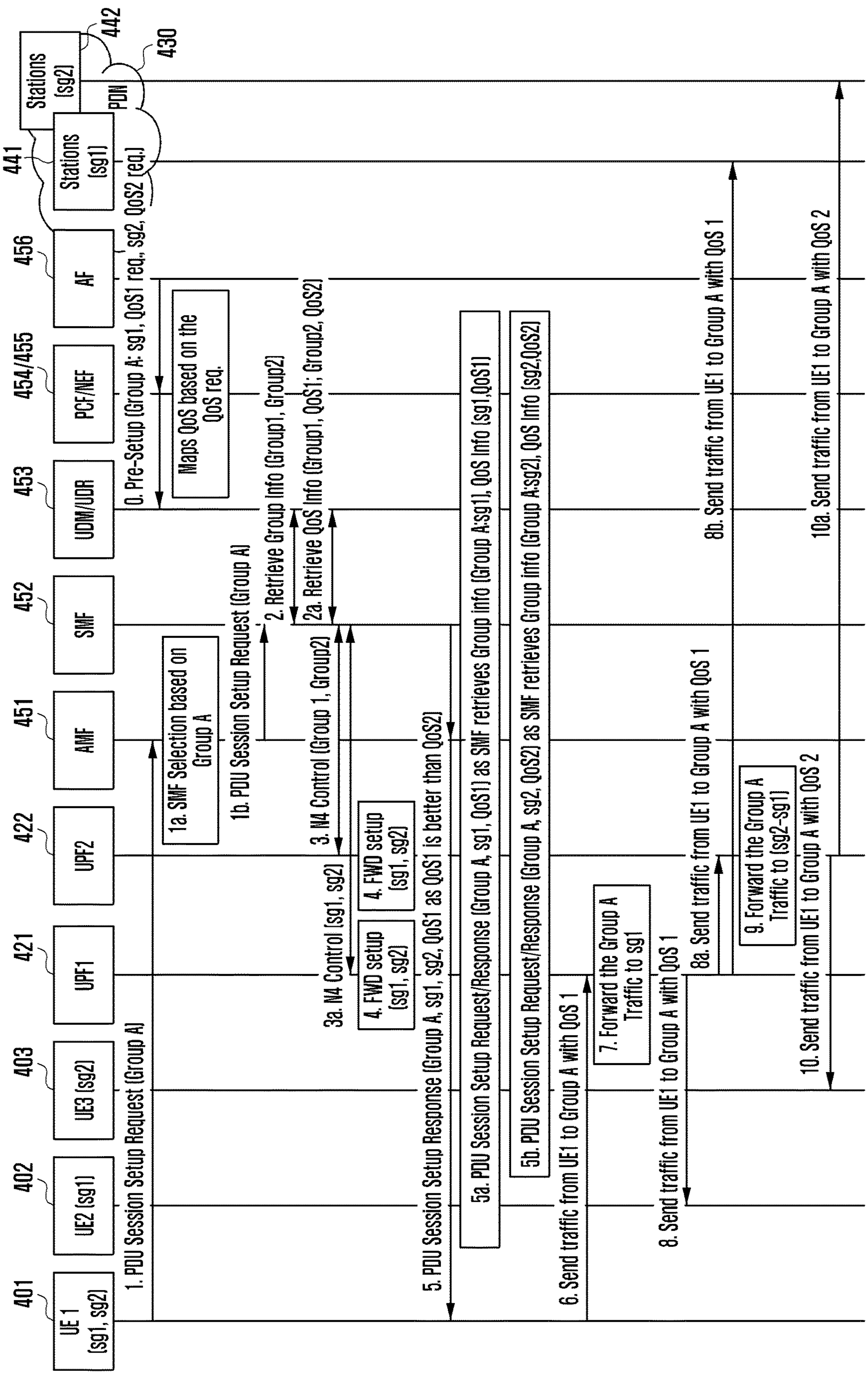
FIG. 5 illustrates a signal flow according to a PDU session setup method using a pre-configured subgroup in a case of using multiple UPFs according to an embodiment of the disclosure.

FIG. 5 illustrates a signal flow according to a PDU session setup method using a pre-configured subgroup in a case of using multiple UPFs according to an embodiment of the disclosure.

Referring to FIG. 5, elements illustrated in FIG. 5 will be described using the NFs described in FIG. 4. However, it should be noted that separate reference numerals are used for unillustrated elements. In addition, a PCF/NEF in FIG. 5 may not indicate that two elements can be implemented as a single server. The PCF/NEF is illustrated as one element to reduce the complexity of the drawing, and operations for respective functions thereof will be separately described.

In stage 0, the AF 456 may configure group information for the UDR 453 through the NEF 455. In this case, as described in the first embodiment of FIG. 4, group A may be configured to have subgroup1 and subgroup2. With respect to subgroup1 and subgroup2, configurations of QoS requirements may be requested as QoS1 req and QoS2 req, respectively. When the QoS requests are stored in the PCF 454, the QoS requests may be mapped to policies of a network and configured as policies of QoS1 and QoS2. The number of types of QoS requirements requested by the AF 456 may be different from the number of QoS policies determined to be actually supported by the PCF 454. For example, QoS1 req and QoS2 req may different, but QoS1 and QoS2 may be identical. In the description below, a case where QoS1 and QoS2 are different from each other is assumed and described.

In stage 1, a UE1 401 belonging to both subgroup1 and subgroup 2 may transmit a PDU session request to the AMF 451 by using a DNN corresponding to group A. In stage 1a, the AMF 451 may select an SMF 452 by using the DNN corresponding to group A. In stage 1b, the AMF 451 may transfer the PDU session request to the selected SMF 452.

In stage 2, the SMF 452 may retrieve, from the UDR/UDM 453, information on subgroup1 and subgroup 2 related to group A to which the UE1 401 subscribes, and in stage 2a, the SMF 452 may retrieve, from the PCF 454, policies of QoS1 related to subgroup1 and QoS2 related to subgroup2.

In stages 3 and 3a, the SMF 452 may request QoS setup and traffic forwarding related to subgroup1 and subgroup2 to each of the UPF1 421 and the UPF2 422.

In stage 4, a traffic forwarding path related to subgroup1 and subgroup 2 may be configured in each of the UPF1 421 and the UPF2 422. The traffic forwarding path setup may be understood to be the same as the forwarding table setup described in FIG. 4. The forwarding table setup may be performed so that forwarding for subgroup1 having a higher QoS has a higher priority than forwarding for subgroup2 having a lower QoS. A group-specific forwarding priority is determined according to a QoS policy level mapped in stage 0 described above, and thus when QoS1 and QoS2 allocated to subgroup1 and subgroup2, respectively, are identical, the forwarding may be configured with the same priority.

In stage 5, the SMF 452 may configure a QoS with QoS1 which is higher between QoS1 allocated to subgroup1 and QoS allocated to subgroup2 while transferring a PDU session setup response to the UE1 401.

In stage 5a, a UE2 402 belonging only to subgroup1 may transmit a PDU session setup request to the AMF 451 by using a DNN for group A while performing a PDU session setup. The AMF 451 may select an SMF 452 by using the DNN corresponding to group A. The selection of an SMF is described in FIG. 4 above, and thus a redundant description is omitted. The AMF 451 may transfer a PDU session request to the selected SMF 452. The SMF 452 may retrieve, from the UDR/UDM 453, information on subgroup 1 related to group A to which the UE2 402 subscribes, and may retrieve a policy of QoS1 related to subgroup1 from the PCF 454. The SMF 452 may request QoS setup and traffic forwarding related to subgroup1 to each of the UPF1 421 and the UPF2 422. A traffic forwarding path related to subgroup1 may be configured as QoS1 in each of the UPF1 421 and the UPF2 422. The SMF 452 may configure a QoS with QoS1 allocated to subgroup1 while transferring a PDU session setup response to the UE2 402.

In stage 5b, a UE3 403 belonging only to subgroup2 may transmit a PDU session setup request to the AMF 451 by using a DNN for group A while performing a PDU session setup. The AMF 451 may select an SMF 452 by using the DNN corresponding to group A. The AMF 451 may transfer a PDU session request to the selected SMF 452. The SMF 452 may retrieve, from the UDR/UDM 453, information on subgroup2 related to group A to which the UE3 403 subscribes, and may retrieve a policy of QoS2 related to subgroup2 from the PCF 454. The SMF 452 may request QoS setup and traffic forwarding related to subgroup2 to each of the UPF1 421 and the UPF2 422. A traffic forwarding path related to subgroup2 may be configured at QoS2 in each of the UPF1 421 and the UPF2 422. The SMF 452 may configure a QoS with QoS2 allocated to subgroup2 while transferring a PDU session setup response to the UE3 403.

In stage 6, the UE1 401 may transmit data toward group A to the UPF1 421 at QoS1.

In stage 7, the UPF1 421 may determine a packet forwarding rule so that data having been transmitted from the UE1 401 toward group A is forwarded to subgroup1 first.

In stage 8, the UPF1 421 may transfer data having been transmitted from UE1 toward group A to the UE2 402 at QoS1, the UE2 belonging to subgroup1.

In stage 8a, the UPF1 421 may transfer data having been transmitted from the UE1 401 toward group A to the UPF2 422. In this case, transmission between the UPF1 421 and the UPF2 422 may be performed at QoS1 corresponding to a higher QoS among QoSs of subgroup1 and subgroup 2.

In stage 8b, the UPF1 421 may transfer data having been transmitted from the UE1 401 toward group A to a station 441 at QoS1, the station belonging to subgroup1 and being located in a data network 430.

In stage 9, the UPF2 422 may determine a packet forwarding rule so that data having been transmitted from the UE1 401 toward group A to subgroup 2 not belonging to subgroup1. Such determination may be made based on stage 5b described above.

In stage 10, the UPF2 422 may transfer data having been transmitted from the UE1 401 toward group A to the UE3 403 at QoS2, the UE3 belonging to subgroup2.

In stage 10a, the UPF2 422 may transfer data having been transmitted from the UE1 401 toward group A to a station 442 at QoS2, the station belonging to subgroup2 and being located in a data network 430.

According to FIG. 5 described above, the operation, described in FIG. 4, of a case of pre-configuring multiple subgroups in one upper group and using a DNN indicating the upper group during a PDU session may be performed. When the embodiment of FIG. 5 is used, data may be transmitted to subgroups having different QoS levels in one group, according to different QoSs.

Figure 6:
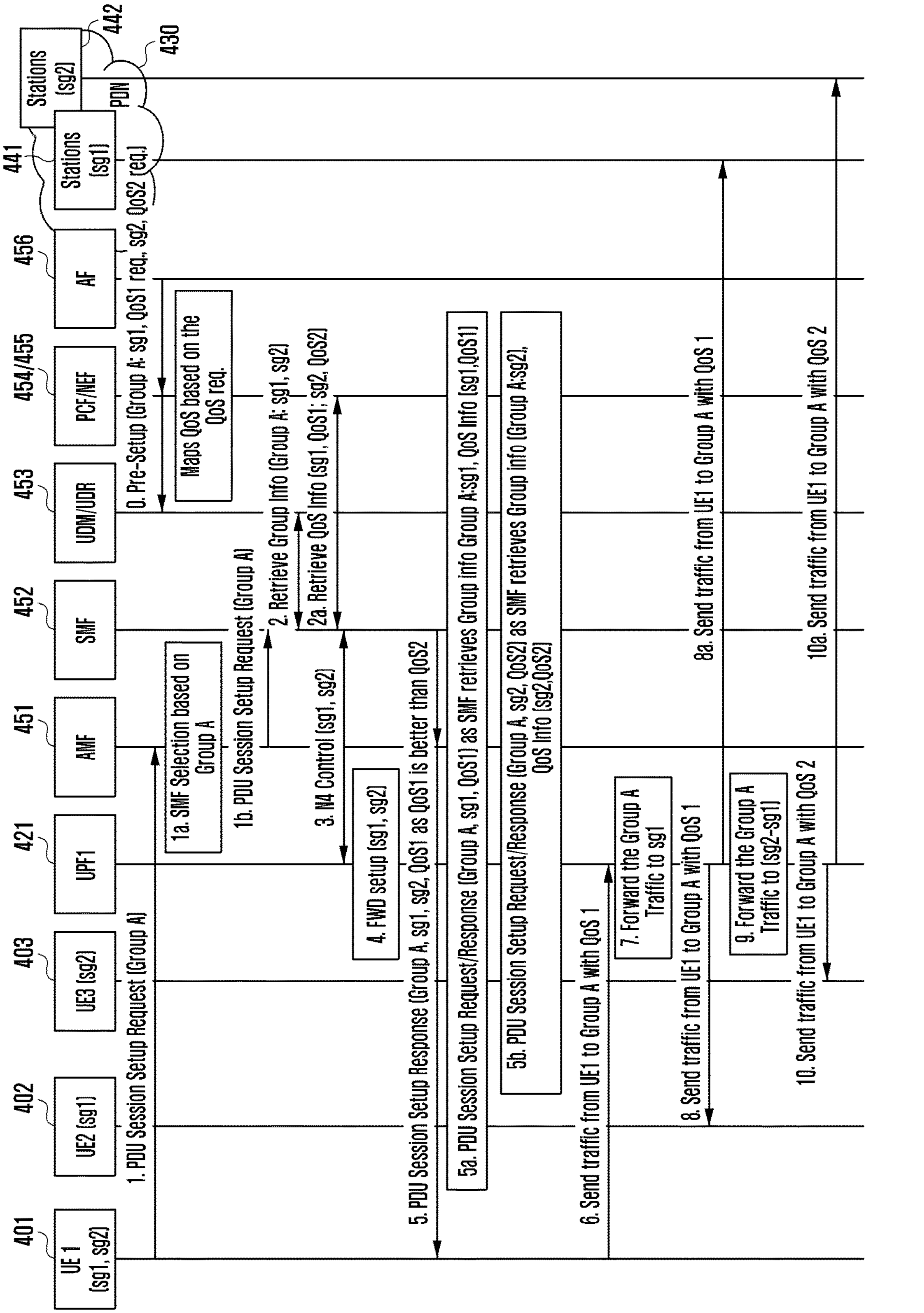
FIG. 6 illustrates a signal flow according to a PDU session setup method using a pre-configured subgroup in a case of using a single UPF according to an embodiment of the disclosure.

FIG. 6 illustrates a signal flow according to a PDU session setup method using a pre-configured subgroup in a case of using a single UPF according to an embodiment of the disclosure.

FIG. 6 is described by using the same reference numerals used in FIG. 5 described above. Accordingly, the same description made to each NF mentioned in FIG. 5 may be applied to FIG. 6.

In stage 0, the AF 456 may configure group information for the UDR 453 through the NEF 455. In this case, as described in the first embodiment of FIG. 4, a case where group A may be configured to have subgroup1 and subgroup2 is assumed. With respect to subgroup1 and subgroup2, configurations of QoS requirements may be requested as QoS1 req and QoS2 req, respectively. When the QoS requests are stored in the PCF 454, the QoS requests may be mapped to policies of a network and configured as policies of QoS1 and QoS2. In addition, the number of types of QoS requirements requested by the AF 456 may be different from the number of QoS policies determined to be actually supported by the PCF 454. For example, QoS1 req and QoS2 req may different, but QoS1 and QoS2 may be identical. In the description below, a case where QoS1 and QoS2 are different from each other is assumed and described.

In stage 1, a UE1 401 belonging to both subgroup1 and subgroup 2 may transmit a PDU session request to the AMF 451 by using a DNN corresponding to group A. In stage 1a, the AMF 451 may select an SMF 452 by using the DNN corresponding to group A. In stage 1b, the AMF 451 may transfer the PDU session request to the selected SMF 452.

In stage 2, the SMF 452 may retrieve, from the UDR/UDM 453, information on subgroup1 and subgroup 2 related to group A to which the UE1 401 subscribes, and in stage 2a, the SMF 452 may retrieve, from the PCF 454, policies of QoS1 related to subgroup1 and QoS2 related to subgroup2.

In stage 3, the SMF 452 may request QoS setup and traffic forwarding related to subgroup1 and subgroup2 to the UPF2 422.

In stage 4, the UPF1 421 may configure a traffic forwarding path related to subgroup1 and subgroup 2. As described in FIG. 5, the traffic forwarding path setup may be understood to be the same as the forwarding table setup described in FIG. 4. The forwarding table setup may be performed so that forwarding for subgroup1 having a higher QoS has a higher priority than forwarding for subgroup2 having a lower QoS. In addition, a group-specific forwarding priority is determined according to a QoS policy level mapped in stage 0 described above, and thus when QoS1 and QoS2 allocated to subgroup1 and subgroup2, respectively, are identical, the forwarding may be configured with the same priority.

In stage 5, the SMF 452 may configure a QoS with QoS1 which is higher between QoS1 allocated to subgroup1 and QoS allocated to subgroup2 while transferring a PDU session setup response to the UE1 401.

In stage 5a, a UE2 402 belonging only to subgroup1 may transmit a PDU session setup request to the AMF 451 by using a DNN for group A while performing a PDU session setup. The AMF 451 may select an SMF 452 by using the DNN corresponding to group A. The selection of an SMF is described in FIG. 4 above, and thus a redundant description is omitted. The AMF 451 may transfer a PDU session request to the selected SMF 452. The SMF 452 may retrieve, from the UDR/UDM 453, information on subgroup1 related to group A to which the UE2 402 subscribes, and may retrieve a policy of QoS1 related to subgroup1 from the PCF 454. The SMF 452 may request QoS setup and traffic forwarding related to subgroup1 to the UPF1 421. The UPF1 421 may configure a traffic forwarding path related to subgroup1 as QoS1. In addition, the SMF 452 may configure a QoS with QoS1 allocated to subgroup1 while transferring a PDU session setup response to the UE2 402.

In stage 5b, a UE3 403 belonging only to subgroup2 may transmit a PDU session setup request to the AMF 451 by using a DNN for group A while performing a PDU session setup. The AMF 451 may select an SMF 452 by using the DNN corresponding to group A. The AMF 451 may transfer a PDU session request to the selected SMF 452. The SMF 452 may retrieve, from the UDR/UDM 453, information on subgroup2 related to group A to which the UE3 403 subscribes, and may retrieve a policy of QoS2 related to subgroup2 from the PCF 454. The SMF 452 may request QoS setup and traffic forwarding related to subgroup2 to the UPF1 421. The UPF1 421 may configure a traffic forwarding path related to subgroup2 at QoS2. The SMF 452 may configure a QoS with QoS2 allocated to subgroup2 while transferring a PDU session setup response to the UE3 403.

In stage 6, the UE1 401 may transmit data toward group A to the UPF1 421 at QoS1.

In stage 7, the UPF1 421 may determine a packet forwarding rule so that data having been transmitted from the UE1 401 toward group A is forwarded to subgroup1 first.

In stage 8, the UPF1 421 may transfer data having been transmitted from the UE1 401 toward group A to the UE2 402 at QoS1, the UE2 belonging to subgroup1.

In stage 8a, the UPF1 421 may transfer data having been transmitted from the UE1 401 toward group A to a station 441 at QoS1, the station belonging to subgroup1 and being located in a data network. Here, the orders of the operations in stages 8 and 8a may be changed or the operations may be simultaneously performed according to a required QoS. For example, when a difference in a latency interval required between QoS2 and QoS1 is small, the operations may be simultaneously performed, or stage 8a may precede stage 8.

In stage 9, the UPF1 421 may determine a packet forwarding rule so that data having been transmitted from the UE1 401 toward group A to subgroup 2 not belonging to subgroup1.

In stage 10, the UPF1 421 may transfer data having been transmitted from the UE1 401 toward group A to the UE3 403 at QoS2, the UE3 belonging to subgroup2.

In stage 10a, the UPF1 421 may transfer data having been transmitted from the UE1 401 toward group A to a station 442 at QoS2, the station belonging to subgroup2 and being located in a data network.

According to FIG. 6 described above, even in a case where there is only one UPF rather than two UPFs, as shown in FIG. 5, an operation of a case of pre-configuring multiple subgroups in one upper group and using a DNN indicating the upper group during a PDU session may be performed.

Figure 7:
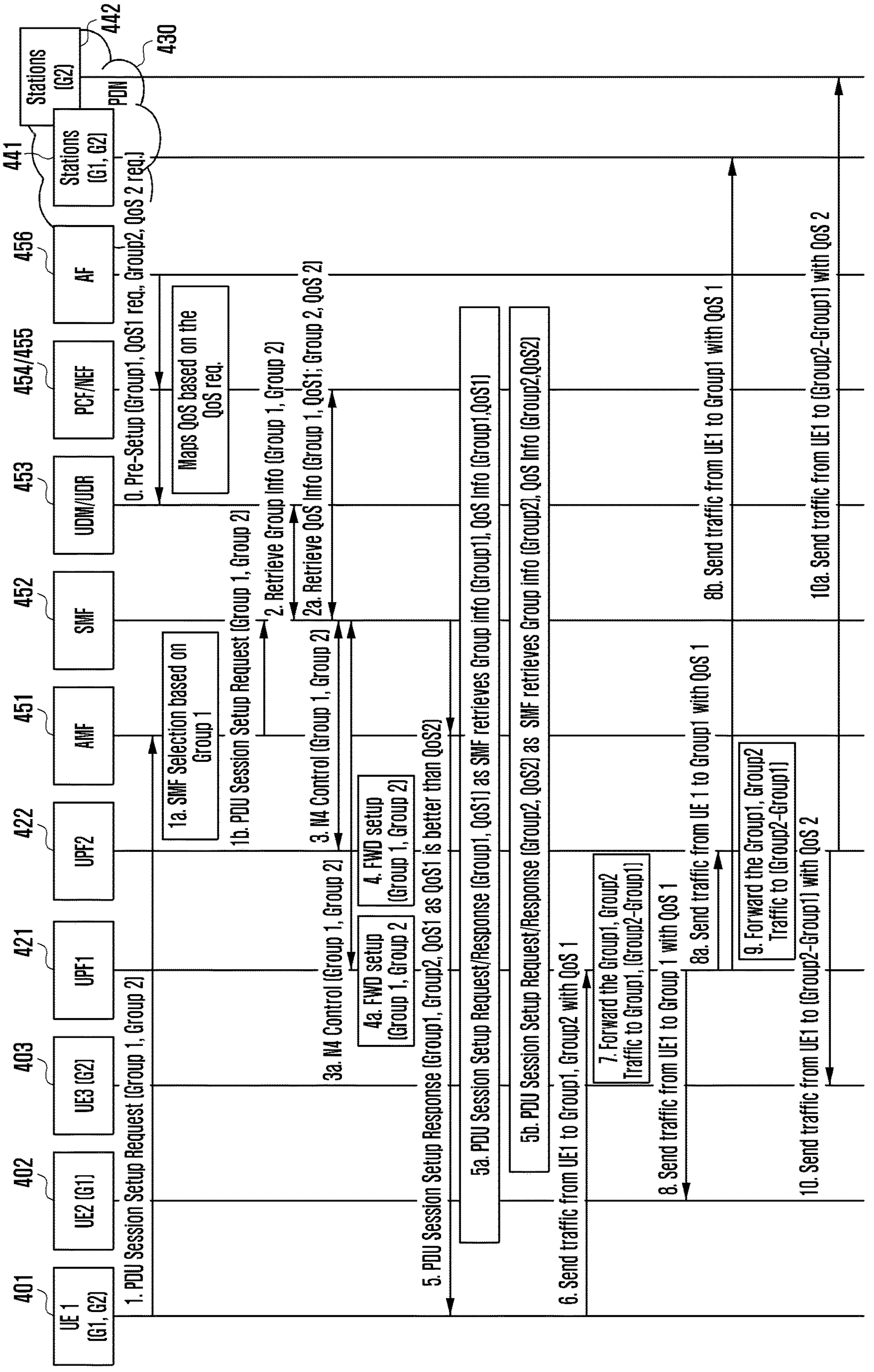
FIG. 7 illustrates a signal flow according to a PDU session setup method using multiple groups in a case of using multiple UPFs according to an embodiment of the disclosure.

FIG. 7 illustrates a signal flow according to a PDU session setup method using multiple groups in a case of using multiple UPFs according to an embodiment of the disclosure.

FIG. 7 is described by also using the same reference numerals used in FIG. 5 described above. Accordingly, the same description made to each NF mentioned in FIG. 5 may be applied to FIG. 7. In addition, the embodiment of FIG. 7 may correspond to the second example in the description in FIG. 4 above.

In stage 0, the AF 456 may configure information on multiple groups for the UDR 453 through the NEF 455. In this case, a case where the multiple groups are configured to have a first group (group1) and a second group (group2) is assumed and described. With respect to group1 and group2, configurations of QoS requirements may be requested as QoS1 req and QoS2 req, respectively. When the QoS requests are stored in the PCF 454, the QoS requests may be mapped to policies of a network and configured as policies of QoS1 and QoS2. In addition, the number of types of QoS requirements requested by the AF 456 may be different from the number of QoS policies determined to be actually supported by the PCF 454. For example, QoS1 req and QoS2 req may different, but QoS1 and QoS2 may be identical. In the description below, a case where QoS1 and QoS2 are different from each other is assumed and described.

In stage 1, a UE1 401 belonging to both group1 and group2 may transmit a PDU session request to the AMF 451 by using a first DNN corresponding to group1 and a second DNN corresponding to group2. The AMF 451 having received the PDU session request by using both the first DNN and the second DNN may select an SMF 452, based on a DNN having the highest priority. In another example, the AMF 451 may select an SMF supporting all of the multiple DNNs. The DNN having the highest priority may be configured in advance. In such a case, when the DNN having the highest priority is pre-configured, configured QoS information is retrieved so that a DNN having the highest ranked QoS policy is determined. When information on the DNN having the highest priority is not pre-configured, a DNN for selecting an SMF may be determined according to an order of a DNN included in the PDU session setup request. FIG. 7 illustrates a case of selecting an SMF, based on group1. Accordingly, the AMF 451 may select an SMF, based on group1 in stage 1a. Thereafter, in stage 1b, the AMF 451 may transfer the PDU session request to the selected SMF 452.

In stage 2, the SMF 452 may retrieve, from the UDR/UDM 453, information on group1 and group 2 to which the UE1 401 subscribes, based on DNNs included in the PDU session setup request and transmitted. Thereafter, in stage 2a, the SMF 452 may retrieve, from the PCF 454, policies of QoS1 related to group1 and QoS2 related to group2.

In stages 3 and 3a, the SMF 452 may request QoS setup and traffic forwarding related to group1 and group2 to each of the UPF1 421 and the UPF2 422.

In stages 4 and 4a, a traffic forwarding path related to group1 and group 2 may be configured in each of the UPF1 421 and the UPF2 422. As described in FIGS. 5 and 6, the traffic forwarding path setup may be understood to be the same as the forwarding table setup described in FIG. 4. The forwarding table setup may be performed so that forwarding for group1 having a higher QoS has a higher priority than forwarding for group2 having a lower QoS. In addition, a group-specific forwarding priority is determined according to a QoS policy level mapped in stage 0 described above, and thus when QoS1 and QoS2 allocated to group1 and group2 are identical, the forwarding may be configured with the same priority.

In stage 5, the SMF 452 may configure a QoS with QoS1 which is higher between QoS1 allocated to group1 and QoS allocated to group2 while transferring a PDU session setup response to the UE1 401.

In stage 5a, a UE2 402 belonging only to group1 may transmit a PDU session setup request to the AMF 451 by using a first DNN corresponding to group1 while performing a PDU session setup. The AMF 451 may select an SMF 452 by using the first DNN corresponding to group1. Here, the selection of an SMF is described in FIG. 4 above, and thus a redundant description is also omitted. The AMF 451 may transfer a PDU session request to the selected SMF 452. The SMF 452 may retrieve, from the UDR/UDM 453, information on group1 related to group1 to which the UE2 402 subscribes, based on the first DNNs included in the PDU session setup request, and may retrieve a policy of QoS1 related to group1 from the PCF 454. The SMF 452 may request QoS setup and traffic forwarding related to group1 to each of the UPF1 421 and the UPF2 422. The SMF 452 may configure a traffic forwarding path related to group1 as QoS1 in each of the UPF1 421 and the UPF2 422. In addition, the SMF 452 may configure a QoS with QoS1 allocated to group1 while transferring a PDU session setup response to the UE2 402.

In stage 5b, a UE3 403 belonging only to group2 may transmit a PDU session setup request to the AMF 451 by using a second DNN corresponding to group2 while performing a PDU session setup. The AMF 451 may select an SMF 452 by using the second DNN corresponding to group2. The AMF 451 may transfer a PDU session request to the selected SMF 452. The SMF 452 may retrieve, from the UDR/UDM 453, information on group2 to which the UE3 403 subscribes, based on the second DNNs included in the PDU session setup request, and may retrieve a policy of QoS2 related to group2 from the PCF 454. The SMF 452 may request QoS setup and traffic forwarding related to group2 to each of the UPF1 421 and the UPF2 422. A traffic forwarding path related to group2 may be configured at QoS2 in each of the UPF1 421 and the UPF2 422. The SMF 452 may configure a QoS with QoS2 allocated to group2 while transferring a PDU session setup response to the UE3 403.

In stage 6, the UE1 401 may transmit data toward group1 and group2 to the UPF1 421 at QoS1.

In stage 7, the UPF1 421 may determine a packet forwarding rule so that data having been transmitted from the UE1 401 toward group1 and group2 is forwarded to group1 first.

In stage 8, the UPF1 421 may transfer data having been transmitted from the UE1 401 toward group1 and group2 to the UE2 402 at QoS1, the UE2 belonging to group1.

In stage 8a, the UPF1 421 may transfer data having been transmitted from the UE1 401 toward group1 and group2 to the UPF2 422 at QoS1 corresponding to a higher QoS among QoSs of group1 and group 2. Here, the orders of the operations in stages 8 and 8a may be changed or the operations may be simultaneously performed according to a required QoS. For example, when a difference in a latency interval required between QoS2 and QoS1 is small, the operations may be simultaneously performed, or stage 8a may precede stage 8.

In stage 8b, the UPF1 421 may transfer data having been transmitted from the UE1 401 toward group1 and group2 to a station 441 at QoS1, the station belonging to group1 and being located in a data network.

In stage 9, the UPF2 422 may determine a packet forwarding rule so that data having been transmitted from the UE1 401 toward group1 and group2 to group 2 not belonging to group1.

In stage 10, the UPF2 422 may transfer data having been transmitted from the UE1 401 toward group1 and group2 to the UE3 403 at QoS2, the UE3 belonging to group2.

In stage 10a, the UPF2 422 may transfer data having been transmitted from the UE1 401 toward group1 and group2 to a station 442 at QoS2, the station belonging to group2 and being located in a data network.

According to FIG. 7 described above, FIG. 7 may be a case of using different DNNs according to different groups. That is, an operation corresponding to the second embodiment described in FIG. 4 may be performed. Even in a case where each group is not classified as one upper group and subgroups, multiple groups are pre-configured, and DNNs indicating the respective groups are used during a PDU session, a service may be provided according to different QoSs.

Figure 8:
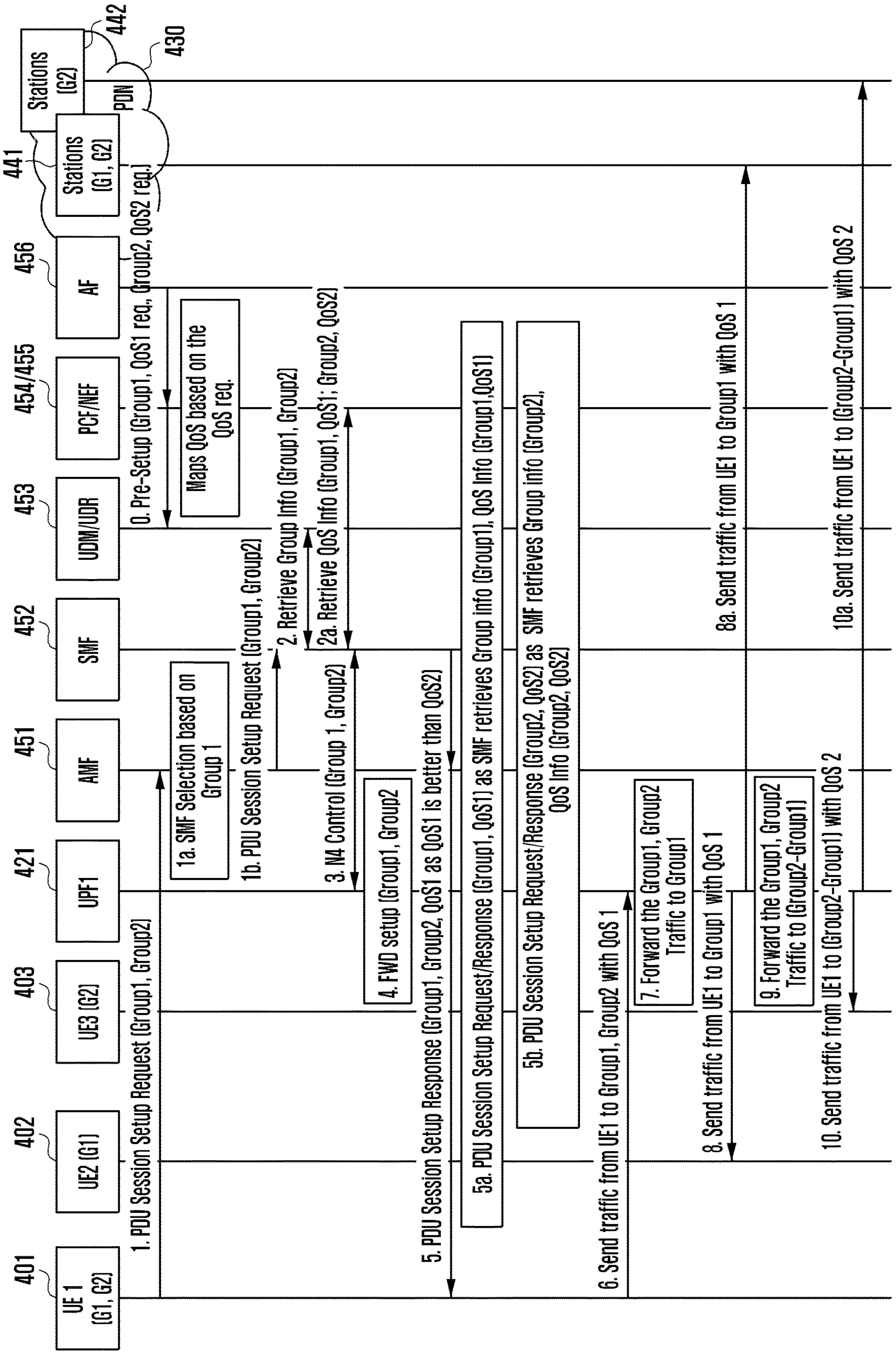
FIG. 8 illustrates a signal flow according to a PDU session setup method using multiple groups in a case of using a single UPF according to an embodiment of the disclosure.

FIG. 8 illustrates a signal flow according to a PDU session setup method using multiple groups in a case of using a single UPF according to an embodiment of the disclosure.

FIG. 8 is described by also using the same reference numerals used in FIG. 5 described above. Accordingly, the same description made to each NF mentioned in FIG. 5 may be applied to FIG. 8. In addition, the embodiment of FIG. 8 may correspond to a case of using one UPF in the second example in the description of FIG. 4 above.

In stage 0, the AF 456 may configure group information for the UDR 453 through the NEF 455. In this case, as described in the first embodiment of FIG. 7, a case where multiple groups are configured to have group1 and group2 is assumed and described. With respect to group1 and group2, configurations of QoS requirements may be requested as QoS1 req and QoS2 req, respectively. When the QoS requests are stored in the PCF 454, the QoS requests may be mapped to policies of a network and configured as policies of QoS1 and QoS2. In addition, the number of types of QoS requirements requested by the AF 456 may be different from the number of QoS policies determined to be actually supported by the PCF 454. For example, QoS1 req and QoS2 req may different, but QoS1 and QoS2 may be identical. In the description below, a case where QoS1 and QoS2 are different from each other is assumed and described.

In stage 1, a UE1 401 belonging to both group1 and group 2 may transmit a PDU session request to the AMF 451 by using both a first DNN corresponding to group1 and a second DNN corresponding to group2. The AMF 451 having received the PDU session request by using both the first DNN and the second DNN may select an SMF 452, based on a DNN having the highest priority. In another example, the AMF 451 may select an SMF supporting all of the multiple DNNs. The DNN having the highest priority may be configured in advance. In such a case, when the DNN having the highest priority is pre-configured, configured QoS information may be retrieved so that a DNN having the highest ranked QoS policy is determined. When information on the DNN having the highest priority is not pre-configured, a DNN for selecting an SMF may be determined according to an order of a DNN included in the PDU session setup request. FIG. 8 illustrates a case of selecting an SMF, based on group1 in the same manner as shown in FIG. 7. Accordingly, the AMF 451 may select an SMF 452, based on group1 in stage 1a. Thereafter, in stage 1b, the AMF 451 may transfer the PDU session request to the selected SMF 452.

In stage 2, the SMF 452 may retrieve, from the UDR/UDM 453, information on group1 and group 2 related to group1 and group2 to which the UE1 401 subscribes, based on DNNs included in the PDU session setup request and transmitted. Thereafter, in stage 2a, the SMF 452 may retrieve, from the PCF 454, policies of QoS1 related to group1 and QoS2 related to group2.

In stage 3, the SMF 452 may request QoS setup and traffic forwarding related to group1 and group2 to the UPF1 421.

In stage 4, the UPF1 421 may configure a traffic forwarding path related to group1 and group 2. As described in FIGS. 5 and 6, the traffic forwarding path setup may be understood to be the same as the forwarding table setup described in FIG. 4. The forwarding table setup may be performed so that forwarding for group1 having a higher QoS has a higher priority than forwarding for group2 having a lower QoS. In addition, a group-specific forwarding priority is determined according to a QoS policy level mapped in stage 0 described above, and thus when QoS1 and QoS2 allocated to group1 and group2 are identical, the forwarding may be configured with the same priority.

In stage 5, the SMF 452 may configure a QoS with QoS1 which is higher between QoS1 allocated to group1 and QoS allocated to group2 while transferring a PDU session setup response to the UE1 401.

In stage 5a, a UE2 402 belonging only to group1 may transmit a PDU session setup request to the AMF 451 by using a first DNN corresponding to group1 while performing a PDU session setup. The AMF 451 may select an SMF 452 by using the first DNN corresponding to group1. Here, the selection of an SMF is described in FIG. 4 above, and thus a redundant description is also omitted. The AMF 451 may transfer a PDU session request to the selected SMF 452. The SMF 452 may retrieve, from the UDR/UDM 453, information on group1 to which the UE2 402 subscribes, based on the first DNNs included in the PDU session request, and may retrieve a policy of QoS1 related to group1 from the PCF 454. The SMF 452 may request QoS setup and traffic forwarding related to group1 to the UPF1 421. The UPF1 421 may configure a traffic forwarding path related to group1 as QoS1. The SMF 452 may configure a QoS with QoS1 allocated to group1 while transferring a PDU session setup response to the UE2 402.

In stage 5b, a UE3 403 belonging only to group2 may transmit a PDU session setup request to the AMF 451 by using a second DNN corresponding to group2 while performing a PDU session setup. The AMF 451 may select an SMF 452 by using the second DNN corresponding to group2. The AMF 451 may transfer a PDU session request to the selected SMF 452. The SMF 452 may retrieve, from the UDR/UDM 453, information on group2 to which the UE3 403 subscribes, based on the second DNNs included in the PDU session setup request, and may retrieve a policy of QoS2 related to group2 from the PCF 454. The SMF 452 may request QoS setup and traffic forwarding related to group2 to the UPF1 421. The UPF1 421 may configure a traffic forwarding path related to group2 at QoS2. The SMF 452 may configure a QoS with QoS2 allocated to group2 while transferring a PDU session setup response to the UE3 403.

In stage 6, the UE1 401 may transmit data toward group1 and group2 to the UPF1 421 at QoS1.

In stage 7, the UPF1 421 may determine a packet forwarding rule so that data having been transmitted from the UE1 401 toward group1 and group2 is forwarded to group1 first.

In stage 8, the UPF1 421 may transfer data having been transmitted from the UE1 401 toward group1 and group2 to the UE2 402 at QoS1, the UE2 belonging to group1.

In stage 8a, the UPF1 421 may transfer data having been transmitted from the UE1 401 toward group1 and group2 to a station 441 at QoS1, the station belonging to group1 and being located in a data network.

In stage 9, the UPF1 421 may determine a packet forwarding rule so that data having been transmitted from the UE1 401 toward group1 and group2 to group 2 not belonging to group1.

In stage 10, the UPF1 421 may transfer data having been transmitted from the UE1 401 toward group1 and group2 to the UE3 403 at QoS2, the UE3 belonging to group2.

In stage 10a, the UPF1 421 may transfer data having been transmitted from the UE1 401 toward group1 and group2 to a station 442 at QoS2, the station belonging to group2 and being located in a data network.

According to FIG. 8 described above, FIG. 8 may be a case of using different DNNs according to different groups, and in this case, may be a case of using only one UPF. That is, the operation in FIG. 8 may be an operation corresponding to the second embodiment described in FIG. 4, and may be a case of using only one UPF. Accordingly, even in a case where multiple groups are pre-configured, DNNs indicating the respective groups are used during a PDU session, and only one UPF is used, a service may be provided according to different QoSs.

Figure 9:
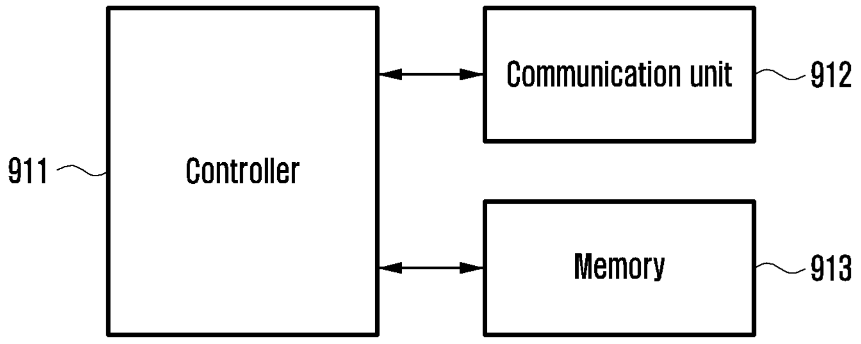
FIG. 9 illustrates a configuration of a UE according to an embodiment of the disclosure.

FIG. 9 illustrates a configuration of a UE according to an embodiment of the disclosure.

Referring to FIG. 9, a UE of the disclosure may include a communication unit 912, a memory 913, and a controller 911. According to the communication method of the UE, described in FIGS. 1 to 8, the controller 911, the communication unit 912, and the memory 913 of the UE may operate. Elements of the UE are not limited to the elements illustrated in FIG. 9. For example, the UE may include more or fewer elements than the elements illustrated in FIG. 9. In addition, the controller 911, the communication unit 912, and the memory 913 may be also implemented as a form of a single chip.

A receiver for wireless communication of the UE and a transmitter for wireless communication of the UE are collectively called the communication unit 912, and the communication unit may transmit or receive a signal to or from a base station or a network entity. The signal transmitted or received to or from the base station may include control information and data. To this end, the communication unit 912 may include an RF transmitter for up-converting and amplifying the frequency of a transmitted signal, an RF receiver for low-noise amplifying a received signal and down-converting the frequency, and the like. However, these are merely provided as an embodiment of the communication unit 912, and the elements of the communication unit 912 are not limited to the RF transmitter and the RF receiver.

In addition, the communication unit 912 may include a wired/wireless transceiver, and may include various elements for transmitting or receiving a signal. In addition, the communication unit 912 may receive a signal through a radio channel and output the same to the controller 911, and may transmit the signal output from the controller 911 through a radio channel. The communication unit 912 receive a communication signal and output the same to the controller 911, and may transmit the signal output from the controller 911 to a network entity through a wired/wireless network.

The memory 913 may store data and a program required for an operation of a UE. In addition, the memory 913 may store data or control information included in a signal (or a message) acquired from the UE. The memory 913 may be include a storage medium such as ROM, RAM, hard disc, CD-ROM, and DVD, or a combination of storage media.

The controller 911 may control a series of processes for operation of a UE according to the embodiments of the disclosure, described in FIGS. 1 to 8. The controller 911 may include one or more processors. For example, the controller 911 may include a communication processor (CP) for performing control such as modulation/demodulation and encoding/decoding of a signal/message/data required during communication, and an application processor (AP) for processing (or controlling), in the upper layer such as an application program, the data/signal/message processed by the communication processor.

In addition, the UE may include an input device/output device for a user and an interface, and devices such as a speaker and a microphone for processing a voice call through VoNR and/or a conventional radio network. The input device may include, for example, at least one of a touchscreen, a touch pad, a styler, a key, a speech recognition device, and a gesture recognition device. The output device may include, for example, at least one of a display, a vibration motor, a speaker, and a lamp.

Figure 10:
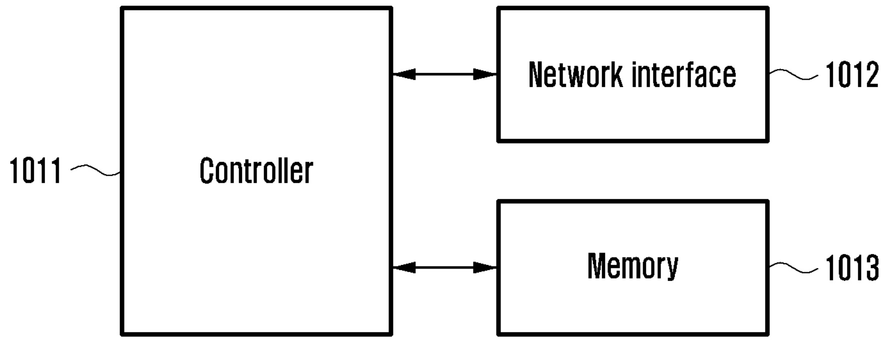
FIG. 10 illustrates a configuration of a network function according to an embodiment of the disclosure.

FIG. 10 illustrates a configuration of a network function according to an embodiment of the disclosure.

The network entity illustrated in FIG. 10 may be at least one of network functions (NFs). Referring to FIG. 10, the network entity may include a controller 1011, a network interface 1012, and a memory 1013. The network entity according to the disclosure may be at least one of the NFs described in FIGS. 1 to 8 above.

In addition, the elements of the NF are not limited to the elements illustrated in FIG. 10. For example, the NF may include more or fewer elements than the above-mentioned elements. In addition, the controller 1011, the network interface 1012, and the memory 1013 may be also implemented as a form of a single chip. The NF may be one of the above-described RAN, AMF, SMF, PCF, UDM/UDR, UPF, and NEF.

An NF receiver and an NF transmitter are collectively called the network interface 1012, and the network interface may transmit or receive a signal to or from a UE 101 or another NF. In this case, the transmitted or received signal/message may include control information and data. When the NF is, for example, a base station, the network interface 1012 may include an RF transmitter for up-converting and amplifying the frequency of a transmitted signal, an RF receiver for low-noise amplifying a received signal and down-converting the frequency, and the like. However, these are merely provided as an embodiment of the network interface 1012, and the elements of the network interface 1012 are not limited to the RF transmitter and the RF receiver. In addition, when the NF is an AMF, the network interface 1012 may be another NF and a device for providing an interface.

The memory 1013 may store data and a program required for an operation of an NF. In addition, the memory 1013 may store data or control information included in a signal acquired from the NF. The memory 1013 may include a storage medium such as ROM, RAM, hard disc, CD-ROM, and DVD, or a combination of storage media.

The controller 1011 may control a series of processes so as to allow the NF to operate according to the above-described embodiments of the disclosure. The controller 1011 may include one or more processors. The methods according to various embodiments described in the claims or the specification of the disclosure may be implemented by hardware, software, or a combination of hardware and software.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a session management function (SMF) in a wireless communication system, the method comprising:

receiving, from an access and mobility management function (AMF), a protocol data unit (PDU) session establishment request message;

obtaining, from a unified data repository (UDR) or a unified data management (UDM), information associated with a group;

obtaining, from a policy control function (PCF), policy information associated with each of subgroups-subgroup in the group;

transmitting, to a user plane function (UPF), a traffic forwarding establishment request message based on the policy information associated with the each subgroup; and transmitting, to a first terminal, a PDU session establishment response message including the information associated with the group and quality of service (Qos) information, wherein the QoS information for the first terminal indicates highest QoS information among QoS information of all the subgroups.

2. The method of claim 1, wherein a plurality of subgroups is included in the group and the QoS information for each subgroup is predefined by an application function (AF), wherein the UDR or the UDM obtains the information associated with the group from the AF, and wherein the PCF obtains the subgroup information from the AF.

3. The method of claim 1, wherein the highest QoS information indicates a highest priority of QoS.

4. A method performed by a user plane function (UPF) in a wireless communication system, the method comprising:

receiving, from a session management function (SMF), a traffic forwarding establishment request message associated with policy information associated with each subgroup in a group, wherein the group includes a plurality of subgroups and the policy information includes quality of service (QoS) information for each of the subgroups;

generating, traffic forwarding rules based on information associated with the group and subgroup information;

receiving, from a first terminal, traffic with an indication of a group to which the traffic is transmitted, wherein the traffic is received with a first QoS; and transmitting the traffic to a second terminal based on the indication, the information associated with the group and the subgroup information, wherein the QoS information for the first terminal indicates highest Qos information among QoS information of all the subgroups.

5. The method of claim 4, wherein the transmitting of the traffic to the second terminal is performed with the first QoS, in case that the second terminal is in a subgroup having the highest QoS among the plurality of subgroups.

6. The method of claim 4, further comprising:

transmitting the traffic to a third terminal based on the indication, the information associated with the group and the subgroup information, wherein the second terminal and the third terminal are in different subgroups and a QoS for subgroup including the second terminal is higher than a QoS for subgroup including the third terminal.

7. The method of claim 4, wherein the highest QoS information indicates a highest priority of QoS.

8. A method performed by a first terminal in a wireless communication system, the method comprising:

transmitting, to an access and mobility management function (AMF), a protocol data unit (PDU) session establishment request message; and receiving, from a session management function (SMF), a PDU session establishment response message including information associated with a group and quality of service (QoS) information, wherein the first terminal belongs to the group and the group includes a plurality of subgroups and the plurality of subgroups is configured with the QoS information for each of the subgroups, and wherein in case that the first terminal belongs to the plurality of subgroups, the QoS information for the first terminal indicates highest QoS information among QoS information of all the subgroups.

9. The method of claim 8, wherein the plurality of subgroups includes a first subgroup and a second subgroup, and wherein the first terminal belongs to the first subgroup and the second subgroup.

10. The method of claim 8, further comprising:

transmitting, to a user plane function (UPF), traffic with indication of a group to which the traffic is transmitted, wherein the traffic is transmitted with the highest QoS information among QoS information of all the subgroups, and wherein the UPF corresponds to the highest QoS information.

11. The method of claim 8, wherein the highest QoS information indicates a highest priority of QoS.

12. A session management function (SMF) in a wireless communication system, the SMF comprising:

a transceiver; and a controller configured to:

receive, from an access and mobility management function (AMF), a protocol data unit (PDU) session establishment request message, obtain, from a unified data repository (UDR) or a unified data management (UDM), information associated with a group, obtain, from a policy control function (PCF), policy information associated with each subgroup in the group, transmit, to a user plane function (UPF), a traffic forwarding establishment request message based on the policy information associated with the each subgroup, and transmit, to a first terminal, PDU session establishment response message including the information associated with the group and quality of service (QoS) information, wherein the QoS information for the first terminal indicates highest QoS information among QoS information of all the subgroups.

13. The SMF of claim 12, wherein a plurality of subgroups is included in the group and the QoS information for the each subgroup is predefined by an application function (AF), wherein the UDR or the UDM obtains the information associated with the group from the AF, and wherein the PCF obtains the subgroup information from the AF.

14. The SMF of claim 12, wherein the highest QoS information indicates a highest priority of QoS.

15. A first terminal in a wireless communication system, the first terminal comprising:

a transceiver; and a controller configured to:

transmit, to an access and mobility management function (AMF), a protocol data unit (PDU) session establishment request message, and receive, from a session management function (SMF), a PDU session establishment response message including information associated with a group and quality of service (QoS) information, wherein the first terminal belongs to the group and the group includes a plurality of subgroups and the plurality of subgroups is configured with the QoS information for each of the subgroups, and wherein in case that the first terminal belongs to the plurality of subgroups, the QoS information for the first terminal indicates highest QoS information among Qos information of all the subgroups.

16. The first terminal of claim 15, wherein the plurality of subgroups includes a first subgroup and a second subgroup, and wherein the first terminal belongs to the first subgroup and the second subgroup.

17. The first terminal of claim 15, wherein the controller is further configured to:

transmit, to a user plane function (UPF), traffic with indication of a group to which the traffic is transmitted, wherein the traffic is transmitted with the highest QoS information among Qos information of all the subgroups, and wherein the UPF corresponds to the highest QoS information.

18. The first terminal of claim 15, wherein the highest QoS information indicates a highest priority of QoS.

* * * * *